(12) United States Patent
Zapf

(10) Patent No.: US 6,593,730 B2
(45) Date of Patent: Jul. 15, 2003

(54) POSITION SENSOR

(75) Inventor: Martin Zapf, Creussen (DE)

(73) Assignee: Cherry GmbH, Auerbach/Opf (DE)

( * ) Notice: Subject to any disclaimer, the term of this patent is extended or adjusted under 35 U.S.C. 154(b) by 0 days.

(21) Appl. No.: 09/885,534

(22) Filed: Jun. 21, 2001

(65) Prior Publication Data
US 2002/0196015 A1 Dec. 26, 2002

(51) Int. Cl.$^7$ .................................................. G01B 7/30
(52) U.S. Cl. ......................... 324/207.17; 324/207.25; 340/870.32
(58) Field of Search ................ 324/207.12, 207.24, 324/207.25, 207.17, 207.16; 340/870.32

(56) References Cited

U.S. PATENT DOCUMENTS

| | | | | |
|---|---|---|---|---|
| 2,878,445 A | * | 3/1959 | Scarborough | 324/207.17 |
| 3,090,933 A | * | 5/1963 | Henry-Baudot | 324/207.17 |
| 4,652,821 A | * | 3/1987 | Kreft | 324/207.23 |
| 5,077,635 A | * | 12/1991 | Bollhagen et al. | 361/287 |
| 5,150,115 A | * | 9/1992 | deJong et al. | 340/870.31 |
| 5,175,497 A | * | 12/1992 | Dobler et al. | 324/207.25 |
| 5,241,268 A | * | 8/1993 | Lee | 324/207.25 |
| 5,535,142 A | * | 7/1996 | Mehnert et al. | 702/189 |
| 6,236,199 B1 | | 5/2001 | Irle et al. | |
| 6,304,076 B1 | * | 10/2001 | Madni et al. | 324/207.17 |
| 6,384,598 B1 | * | 5/2002 | Hobein et al. | 324/207.17 |
| 6,522,128 B1 | * | 2/2003 | Ely et al. | 324/207.17 |

FOREIGN PATENT DOCUMENTS

| | | |
|---|---|---|
| DE | 43 35 701 A | 4/1995 |
| EP | 0 452 803 A | 10/1991 |
| EP | 0 992 765 A1 | 4/2000 |
| JP | 57-200803 | * 12/1982 ............ G01B/7/02 |

* cited by examiner

*Primary Examiner*—Edward Lefkowitz
*Assistant Examiner*—Darrell Kinder
(74) *Attorney, Agent, or Firm*—Miles & Stockbridge P.C.; John C. Kerins; Edward J. Kondracki

(57) ABSTRACT

A position sensor for determining a set position thereof is disclosed. The sensor comprises a time-varying magnetic field generator. A movable electrically conductive element is positioned such that the time-varying magnetic field generates eddy currents therein. At least one pick-up is provided for generating a signal in response to the time-varying magnetic field. Movement of the conductive element relative to the pick-up alters the magnetic coupling between the magnetic field generator and the pick-up allowing the set position to be determined unambiguously.

9 Claims, 4 Drawing Sheets

Drive and sensor circuitry

POSITION SENSOR

FIELD OF THE INVENTION

The present invention relates to a position sensor which may be used, for example, as an electronic controller or a rotary switch, in particular for controlling a cooking hob.

BACKGROUND OF THE INVENTION

Many rotary switches are used in the field of household goods in order to adjust washing programs in washing machines or temperature settings in electric cookers. Such rotary switches suffer, however from several drawbacks.

A significant drawback of currently existing rotary switches is that they are generally not free from wear and tear, and may suffer from deterioration in performance during their effective life. A further disadvantage is that they are generally complex to produce and complicated to contact with a control panel.

Selector switches may be incorporated on a control panel. Such switches have, however, a limited lifetime and they lack the flexibility of a rotary switch since the number of positions is limited by the geometric construction. Furthermore, as the number of positions increases, so the complexity of the switch also increases, increasing the cost. If sensors are employed which produce a sensor signal in response to a change of field caused by rotation of the rotary switch, this disadvantage can be overcome. Such sensors are, however, generally temperature sensitive, expensive and often show a hysterisis, which limits the number of switch positions. An example of such a field sensing switch would be one which incorporates a capacitive mechanism, wherein the capacitance is altered by the rotation of the selector. Such an arrangement is not suitable in many situations because of its sensitivity to dampness. Sensors which use the phenomenon of induction are resistant to dampness.

Inductive position sensors are known in the field of electric motors and the like for determining the angular position of the rotor. An example is described in U.S. Pat. No. 5,621,179. A rotary position sensor which employs planar coils is described in U.S. Pat. No. 4,507,638. In the arrangement described therein, a rotatable plate is interposed between drive and sensing coils. The rotatable plate is fabricated from a material which blocks a magnetic field induced in the drive coil from reaching or activating the sensing coil. To provide position sensitivity, the rotatable plate may have a cam-like shape. Alternatively, a plurality of drive and sense coils may be used having a distribution around the operating angle. Pulsed or A.C. signals are applied to the drive coils, which may be in the form of a planar coil on a printed circuit board.

A further position sensor is described in U.S. Pat. No. 5,239,288. The sensor described therein comprises a stator assembly and a rotor assembly. Each of the stator and rotor assemblies comprise a plurality of layers upon which one or more multi-turn coils are arranged. An A.C. signal is applied to one of the stator windings which results in a current being generated in the rotor windings. As a result, a signal which is dependent on the angular position of the rotor is generated in further coils of the stator.

SUMMARY OF THE INVENTION

In particular, the present invention provides a position sensor for determining a set position thereof, characterized in that the sensor comprises:

a time-varying magnetic field generator;

an electrically conductive element positioned such that said time-varying magnetic field generates eddy currents therein;

at least one pick-up for generating a signal in response to said time-varying magnetic field; and a signal processor arranged to receive said signal and to determine the set position of the position sensor, wherein the conductive element is movable relative to the at least one pick-up such that the signal generated by said pick-up has a magnitude which is dependent on the position of said conductive element, the position of the conductive element corresponding to the set position of the sensor.

The sensor may comprise at least two pick-ups, with signals from the two pick-ups being processed in combination to determine a sensor set position. Certain embodiments of the invention, in particular a linear position sensor require only a single pick-up for the sensor set position to be determined. The pick-ups are preferably in the form of an inductively coupled sensor loops having a combined projected area which is less than a projected area of a drive loop.

In a particular embodiment, the magnetic field is generated by a circular drive loop, which may be spiral in design and detected by two sensor loops which may each also be spiral, generally in the form of a sector. Several sensors may be multiplexed together, with a single processor determining the set position of each sensor. If desired, an isolation switch can be incorporated into the sensor to provide a positive disconnection, for safety reasons.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS

Figure 1:
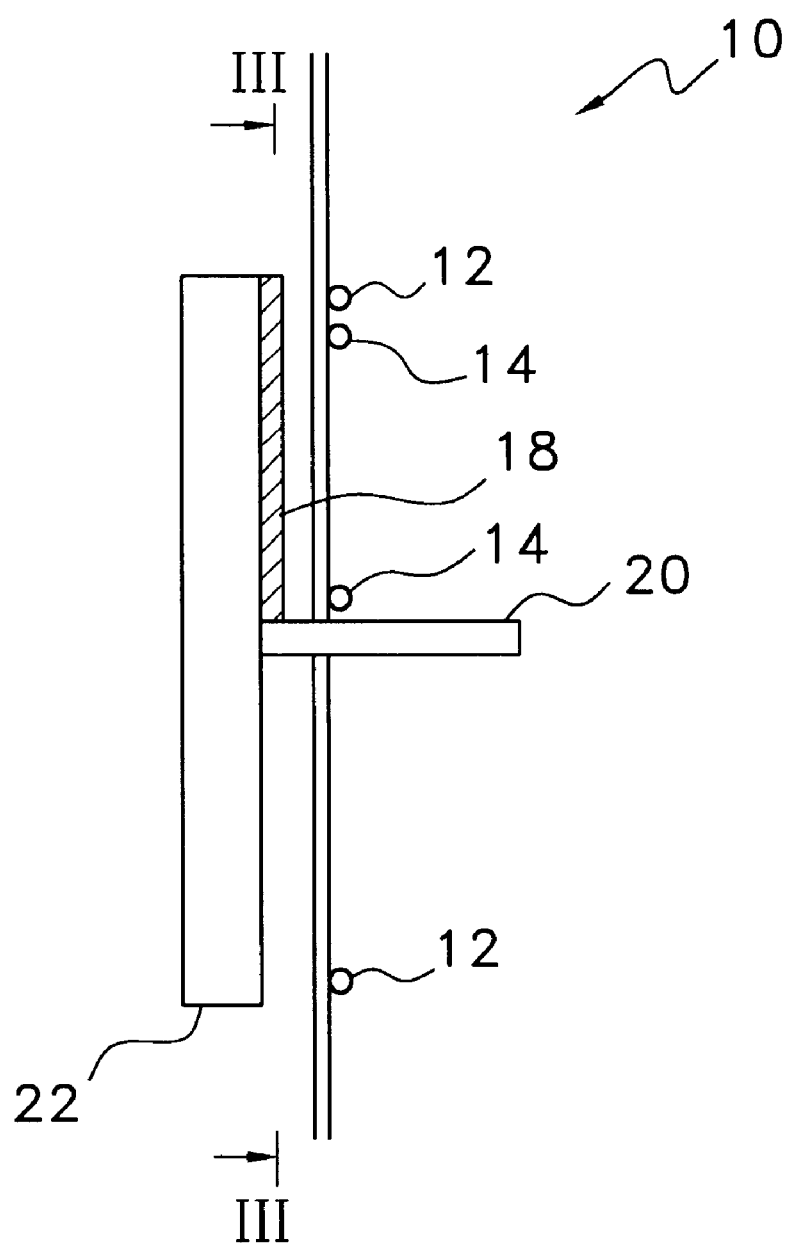
FIG. 1 is a cross section of a rotary position sensor of the invention.
Figure 2:
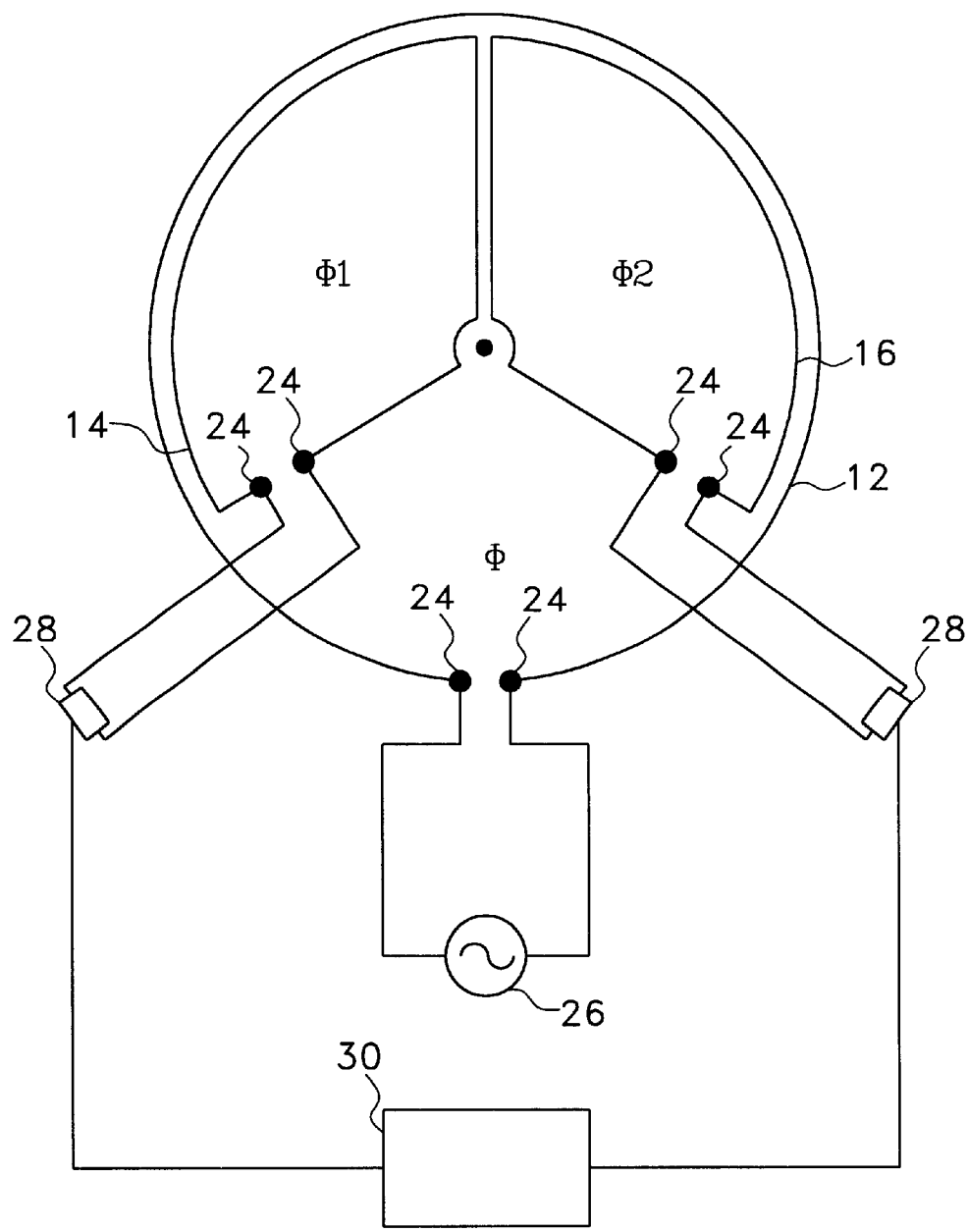
FIG. 2 is a schematic view of a sensor of the invention showing drive and sensor coil arrangements together with associated circuitry.

Referring to FIGS. 1 and 2 there is shown a rotary position sensor 10 of the invention. The position sensor 10 comprises a drive coil 12 and two sensor coils 14 and 16. A conductive shielding plate 18 is attached to a rotatable spindle 20. In the embodiment shown in FIG. 1, the shielding plate 18 is attached to a control knob 22 made of plastic.

Figure 3:
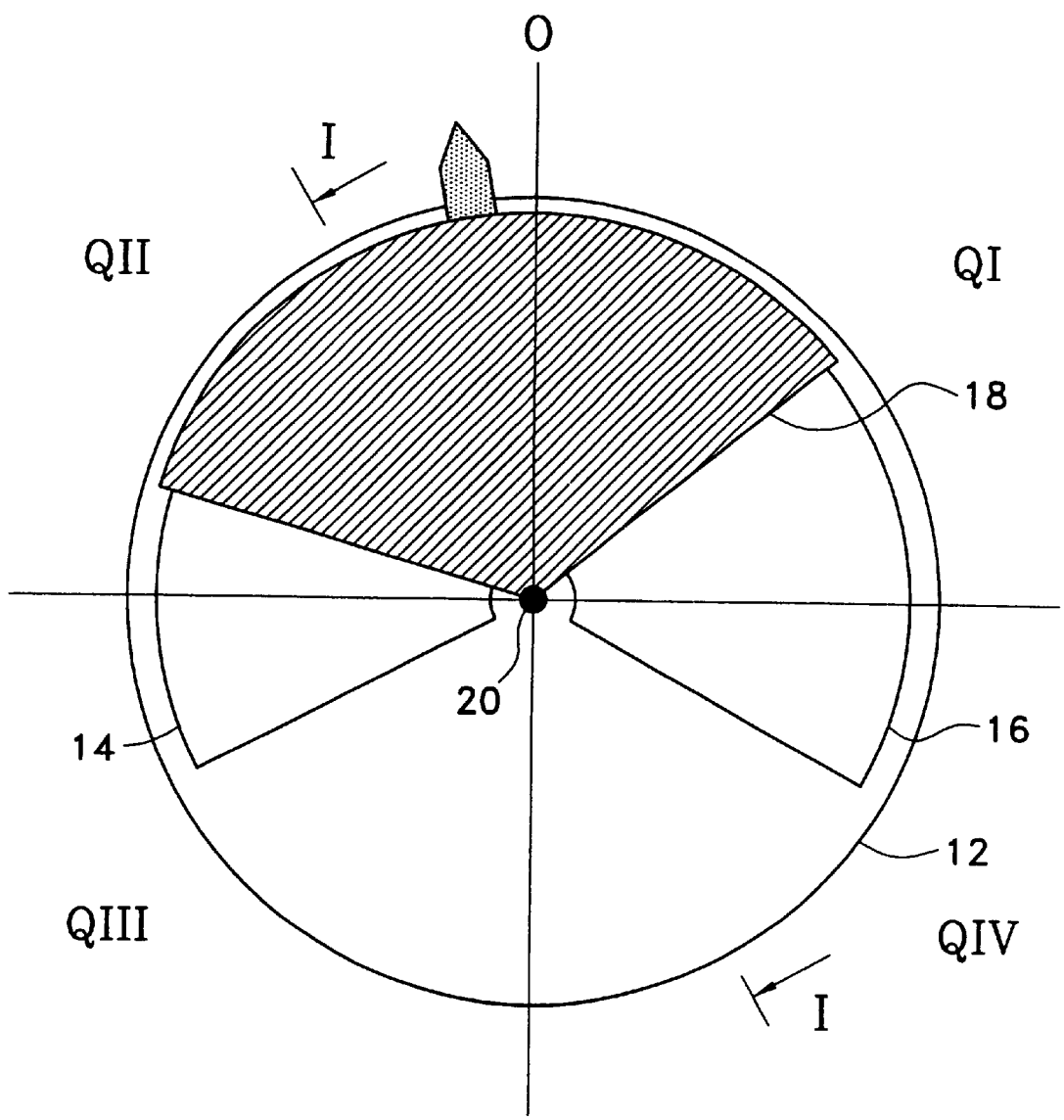
FIG. 3 shows the FIG. 2 arrangement with a shielding element overlying the coils.

The drive coil 12 and the sensor coils 14 and 16 are shown as being single-turn loops with connectors 24 at the end of the loops. Alternatively, one or more of the coils could be multi-turn coils, having a spiral-like structure. The drive coil 12 has a shape which approximates to a full circle, whilst the sensor coils 14 and 16 are in the form of a sector, with an enclosed area approximately one third of that of the drive coil 12. As shown in FIG. 3, the shielding plate 18 is also in the form of a sector which has a surface area which is approximately equal to one third of that of the drive coil 12. The drive coil 12 and the sensor coils 14 and 16 are preferably tracks defined on a printed circuit board. The shielding plate is preferably punched out from normal steel sheet, bonded to the control knob 22 and the rotatable spindle 20 by injection moulding.

The shielding plate preferable is in the shape of a sector of a circle. It should, however, be noted that the shape of the shielding plate may be any form which may be rotated around the rotatable spindle 20. The surface area of the shielding plate should not be less than one third of the area inside of the drive coil.

The connectors 24 of the drive coil 12 are connected to an A.C. current source 26. Voltages induced in the sensor coils 14 and 16 are converted into respective D.C. signals by respective converters 28. These D.C. signals are then processed by a microcontroller 30 which includes analog to digital conversion capability.

The current source 26 provides a time varying current to the drive coil 12 of approximately 5 mA which generates a time varying magnetic flux $\Phi$. This time varying magnetic flux has components $\Phi 1$ and $\Phi 2$ penetrating the sensor coils 14 and 16 respectively. These magnetic fluxes induce a current in each of the sensor coils 14 and 16 which leads to a potential difference being generated across a resistance in the coils. This induced potential difference is directly proportional to the amplitude of the imposed current in the drive coil 12 and the drive frequency.

The shielding plate 18, which acts as a conductive element, lies in the magnetic field generated by the drive coil 12. As a result, eddy currents are generated in the shielding plate 18 and therefore a magnetic field is generated which opposes the magnetic field generated by the drive coil 12. The superposition of these fields means that the magnetic fields experienced by the two sensor coils 14 and 16 are reduced when the shielding plate 18 is the vicinity thereof. The exact positioning of the shielding plate 18 therefore leads to a predictable influence on the potential difference generated in the two sensor coils 14 and 16, with the greater the coverage of the coil, the lower the induced voltage across the coil. An analysis of the potential differences generated by the sensor coils leads to a determination of the position of the shielding plate 18, and therefore the control knob 22.

The oscillating current source 26 preferably comprises a low-cost CMOS inverter. The oscillator clock could have a frequency of 4, 8 or 12 MHz, or another frequency. This alternating voltage is applied to the drive coil 12 as a drive current via an output current limiting resistor (not shown).

The potential differences across the sensor coils 14 and 16 are each transformed into a D.C. voltage by means of a simple amplitude detector comprising a Schottky diode, two resistors and two capacitors which can then be passed to the analog to digital port of the microcontroller 30. Should the amplitude of the signals generated by the sensor coils 14 and 16 be too low, perhaps because of a small surface area, they can be amplified by a low cost operational amplifier.

The necessary computational analysis for determining the set position of the sensor 10 will now be described.

Defining the D.C. signals generated across the sensor coils 14 and 16 as U1 and U2 respectively, a relative induced signal measure I is calculated where I=U1/U2. A total induction measure G is also calculated where G=U1+U2.

The values of I and G are used to determine the position of the shielding plate 18 by comparing them with data stored in a look-up table. Whilst the relative signal I provides a generally good basis for determining the relative position of the shielding plate 18, it may be ambiguous. For example, when the shielding plate is in the uppermost position shown in FIG. 3, the signals U1 and U2 are approximately equal. This will also be the case when the shielding plate is in the lowermost position. Since I is the same in both cases, the position of the shielding plate can not be determined from I exclusively in these situations. In such situations, the total induction measure G is used to determine absolute position.

Because the electronic components can be arranged in close proximity, the influence of temperature on the detected signals is equal such that the temperature has little or no effect on the relative measure I. The temperature is likely to have an influence on the total measure G and therefore this is used only to determine the coarse position of the shielding plate (whether in quadrant QII/QIII or QI/QIV of FIG. 3). For this purpose, any temperature dependence of G will not affect the determination of sensor position.

Manufacturing tolerance effects in the shielding plate 18 and the coils 12, 14 and 16 and particularly the associated electronics are taken into account in an initial calibration where I and G are calculated with the sensor set in a zero position. This calibration can be performed automatically.

In a preferred embodiment, the position sensor 10 is arranged to have twenty-four set positions, equally distributed around the circumference of the drive coil 12. If desirable, a notched wheel can be attached to the spindle 20 to give a tactile indication of these positions. The number of set positions is limited by the sensitivity of the electronics and the processing capability of the microcontroller. If an increase in the number of positions is subsequently desired, the program stored in the microcontroller could be up-dated or a replacement microcontroller inserted, and if appropriate the notched wheel exchanged.

Whilst the preferred embodiment incorporates two sensor coils, the number of sensor coils could be greater than this number. For such arrangements, the ratios of the induced signals of adjacent coils could be used to determine the position of the shielding plate and the position of the shielding plate may be determined unambiguously by such ratio measurements. Where desirable, a separate on/off switch, operated by the control knob 22, can be incorporated into the position sensor to provide a positive disconnection. A switch suitable for such purposes might be a D4 switch available from Cherry GmbH.

Where several position sensors are grouped together on a single unit, the sensor coils can be multiplexed to the two peak detectors, thereby reducing the overall cost. Should there be more than one unit, then the drive coils can be connected in series.

The position sensor of the present invention is suitable for incorporation in control panels for cookers to control, for example, the setting of an electric hob element and other household machines. The temperature independence and lack of sensitivity to moisture being particularly beneficial in this application. Applications in the automobile industry would be suitable with the insensitivity to the surrounding environment being relevant here.

Whilst the position sensor has been described with reference to a rotary sensor, the principles of operation are extendable to linear position sensors, for example sliding controls. For such an application, a rectangular drive coil of length l and two adjacent rectangular coils of length l/2 would operate in conjunction with a shielding plate of length l/2.

The described position sensor is stable, meaning that even after a power failure, the switch position may be determined, with the determination of the switch position not being made by monitoring incremental changes in position. The sensors are generally temperature insensitive and resistant to dampness and because of the low resistance of the coils they are not sensitive to parasitic electromagnetic influences. Furthermore such sensors have very low electromagnetic interference characteristics.

Figure 4:
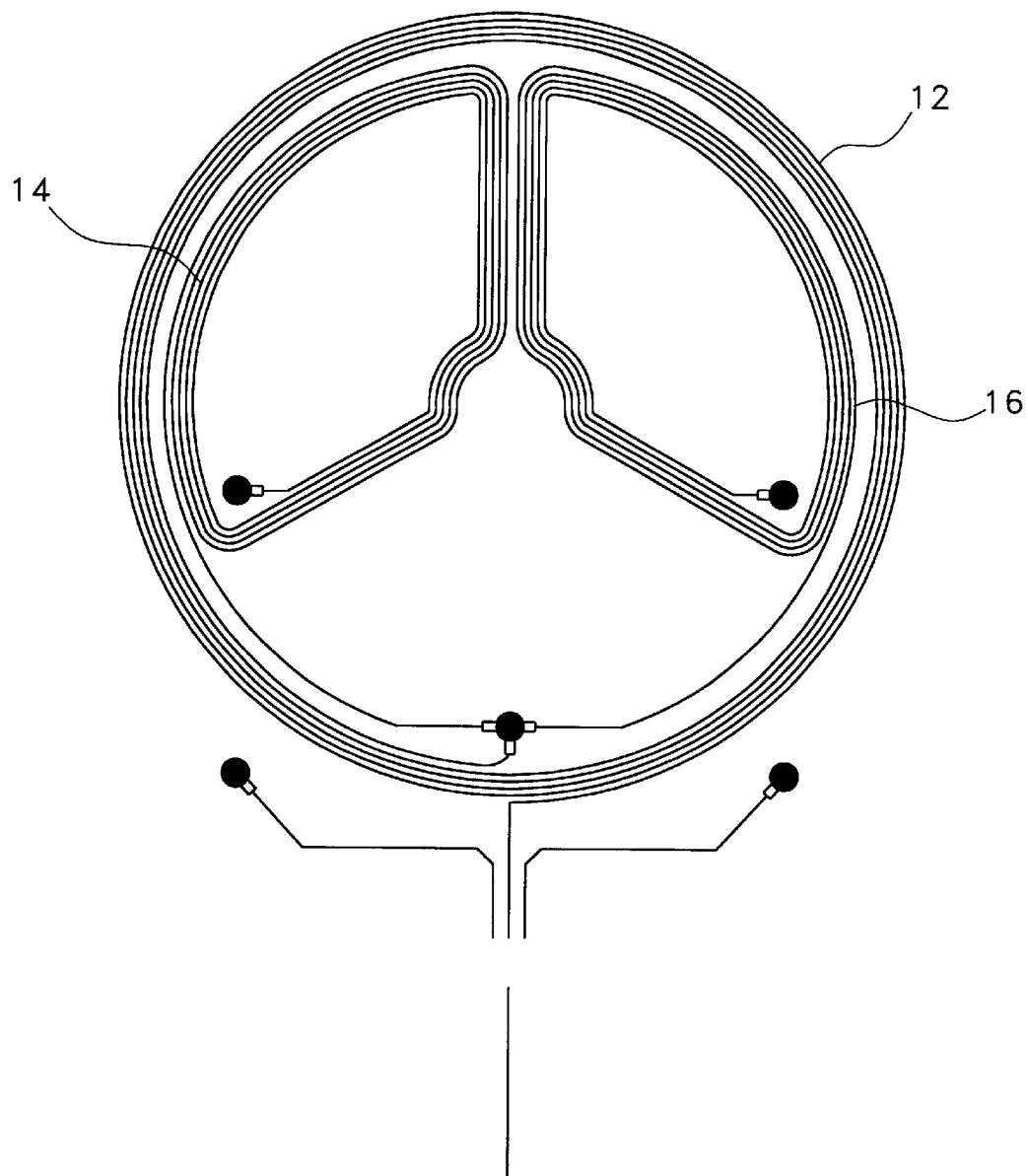
FIG. 4 shows a further view of a drive and sensor coil arrangement.

As described above, it may be preferable for either the drive coil or the sensor coils, or all the coils to comprise multi-turn coils. Such an arrangement is shown in FIG. 4.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

I claim:

1. A position sensor for determining a set position thereof, comprising:

a time-varying magnetic field generator;
 an electrically conductive movable element positioned such that said time-varying magnetic field generates eddy currents therein;
 at least two pick-ups each for generating signals in response to said time-varying magnetic field; and
 a signal processor arranged to receive said signals and to determine the set position of the position sensor,
 wherein the said conductive element is movable relative to the at least two pick-ups such that the signals generated by said pick-ups have a magnitude which is dependent on the position of said conductive element, the position of the conductive element corresponding to the set position of the rotary sensor,
 wherein the signal processor is arranged to receive and process the signals from said at least two pick-ups in combination,
 wherein the time-varying magnetic field generator comprises a conductive drive loop and an alternating current generator for passing an alternating current around said drive loop and said at least two pick-ups, said pick-ups comprising sensor loops, each arranged within a projected area of said drive loop, such that said two sensor loops have a combined projected area which is less than the projected area of said drive loop, and
 wherein said electrically conductive movable element has a surface area substantially equal to the projected area of each one of said two sensor loops.

2. A rotary position sensor according to claim 1, wherein the drive loop is substantially circular in outline and wherein the two sensor loops each have a projected area in the shape of a sector of a circle, and the conductive element is rotatable relative to the two sensor loops.

3. A rotary position sensor according to claim 2, wherein the projected area of said two sensor loops is substantially equal to two thirds the projected area of said drive loop and wherein said conductive element has a surface which is in the shape of a sector of a circle, substantially equal to the projected area of one sensor loop.

4. A rotary position sensor according to claim 2, wherein the signal processor calculates the sum and the quotient of the pick-up signals to determine the unambiguous sensor position.

5. A rotary position sensor according to claim 1, wherein the sensor incorporates an isolation switch.

6. A position sensor for determining a set position thereof, comprising a plurality of sensors multiplexed to a single signal processor, each sensor comprising:

a time-varying magnetic field generator;
 an electrically conductive element positioned such that said time-varying magnetic field generates eddy currents therein;
 at least two pick-ups each for generating signals in response to said time-varying magnetic field; and
 a signal processor arranged to receive said signals and to determine the set position of the position sensor,
 wherein the said conductive element is movable relative to the at least two pick-ups such that the signals generated by said pick-ups have a magnitude which is dependent on the position of said conductive element, the position of the conductive element corresponding to the set position of the rotary sensor, and
 wherein the signal processor is arranged to receive and process the signals from said at least two pick-ups in combination, and
 wherein the sensor comprises a conductive drive loop and an alternating current generator for passing an alternating current around said drive loop and said at least two pick-ups, said pick-ups comprising sensor loops, each arranged within a projected area of said drive loop such that said two sensor loops have a combined projected area which is less than the projected area of said drive loop, and
 wherein said electrically conductive element has a surface area substantially equal to the projected area of each one of said two sensor loops.

7. A rotary position sensor according to claim 6, wherein the drive loop is substantially circular in outline and wherein the two sensor loops each have a projected area in the shape of a sector of a circle, and the conductive element is rotatable relative to the two sensor loops.

8. A rotary position sensor according to claim 6, wherein the projected area of said two sensor loops is substantially equal to two thirds the projected area of said drive loop and wherein said conductive element has a surface which is in the shape of a sector of a circle.

9. A rotary position sensor according to claim 6, wherein the signal processor calculates the sum and the quotient of the pick-up signals to determine an unambiguous sensor position.

* * * * *